No. 819,861. PATENTED MAY 8, 1906.
J. L. CRISLER.
HARROW ATTACHMENT FOR PLOWS.
APPLICATION FILED APR. 6, 1905.

2 SHEETS—SHEET 1.

Witnesses

Inventor
Joseph L Crisler
By
Attorney

No. 819,861. PATENTED MAY 8, 1906.
J. L. CRISLER.
HARROW ATTACHMENT FOR PLOWS.
APPLICATION FILED APR. 6, 1905.
2 SHEETS—SHEET 2.
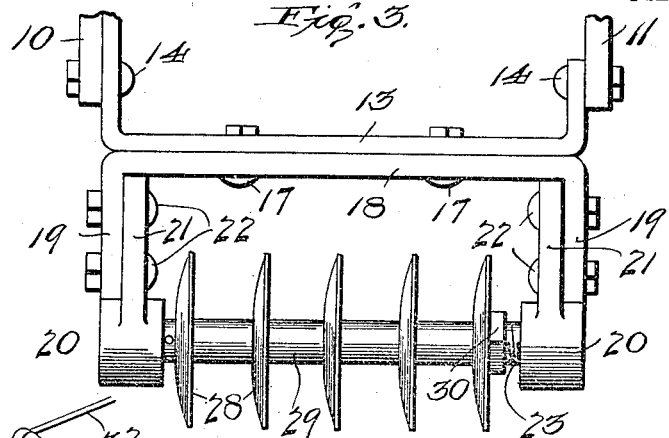
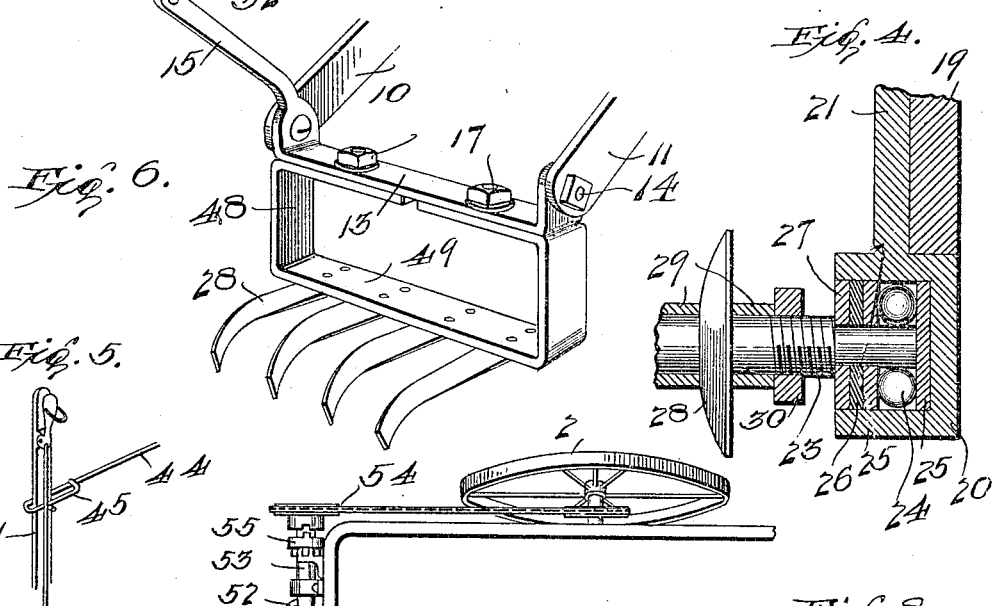
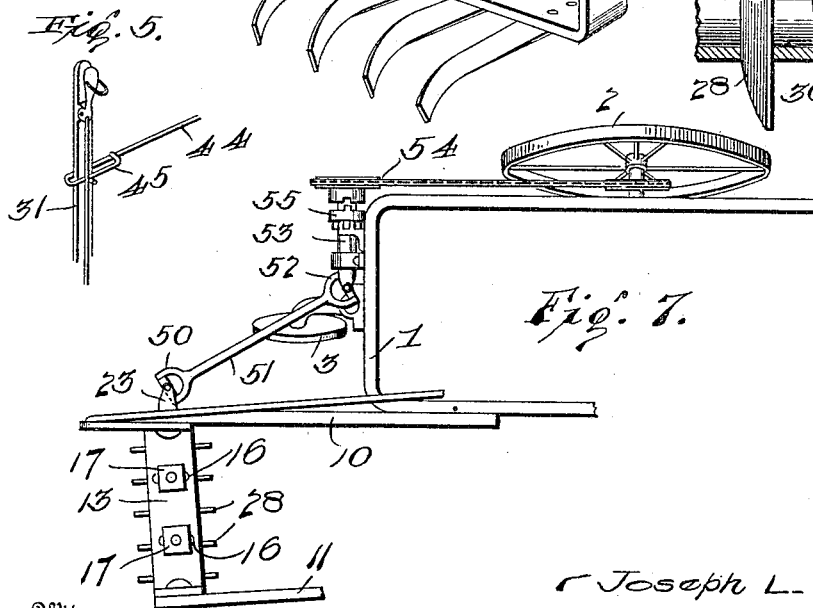
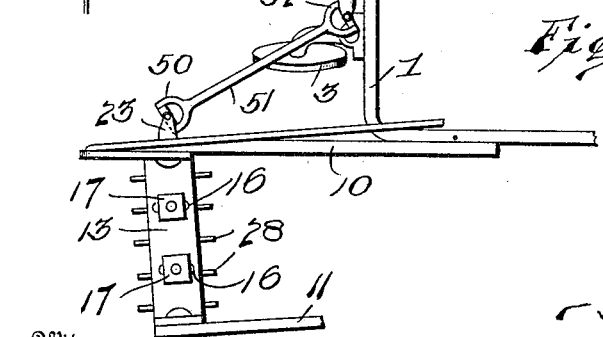
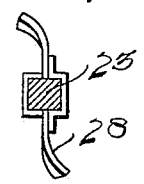
Inventor
Joseph L. Crisler
By Rexford M. Smith
Attorney
Witnesses

UNITED STATES PATENT OFFICE.

JOSEPH L. CRISLER, OF PERTH, KANSAS.

HARROW ATTACHMENT FOR PLOWS.

No. 819,861. Specification of Letters Patent. Patented May 8, 1906.

Application filed April 6, 1905. Serial No. 254,182.

*To all whom it may concern:*

Be it known that I, JOSEPH L. CRISLER, a citizen of the United States, residing at Perth, in the county of Sumner and State of Kansas, have invented a certain new and useful Harrow Attachment for Plows, of which the following is a specification, reference being had therein to the accompanying drawings.

This invention relates to harrow attachments for plows, the main object of the invention being to equip a wheeled plow with a harrow attachment which when applied to the frame of the plow is laterally offset to one side of the plow and arranged to operate upon the soil just after it has been turned over or thrown up by the moldboard of the plow, such arrangement being particularly well adapted to certain soils in which it is desirable and important to break up and pulverize the soil and clods as soon as the earth is turned over by the plow. The two operations of plowing and harrowing are thus performed by the machine at one and the same time.

A further object of the invention is to provide manually-operated means for tilting or rocking the harrow elements in order to enable them to clear and pass over stumps and other obstructions without injury; also, to provide means by which the harrow elements or the part of the machine carrying the same may yield or tilt automatically for the same purpose; also, to provide means by which that part of the machine which carries the harrow elements may be raised automatically in turning the machine.

A further object of the invention is to provide a machine embodying all the above features in connection with which interchangeable harrow elements of different kinds may be used, also to provide means whereby a shaft carrying rotary harrow elements may be driven irrespective of the variation in the position of such shaft.

A further object of the invention is to provide means whereby when the plow is elevated the harrow will simultaneously be elevated.

With the above and other objects in view the invention consists in the novel construction, combination, and arrangement of parts, as herein fully described, illustrated, and claimed.

Figure 1:
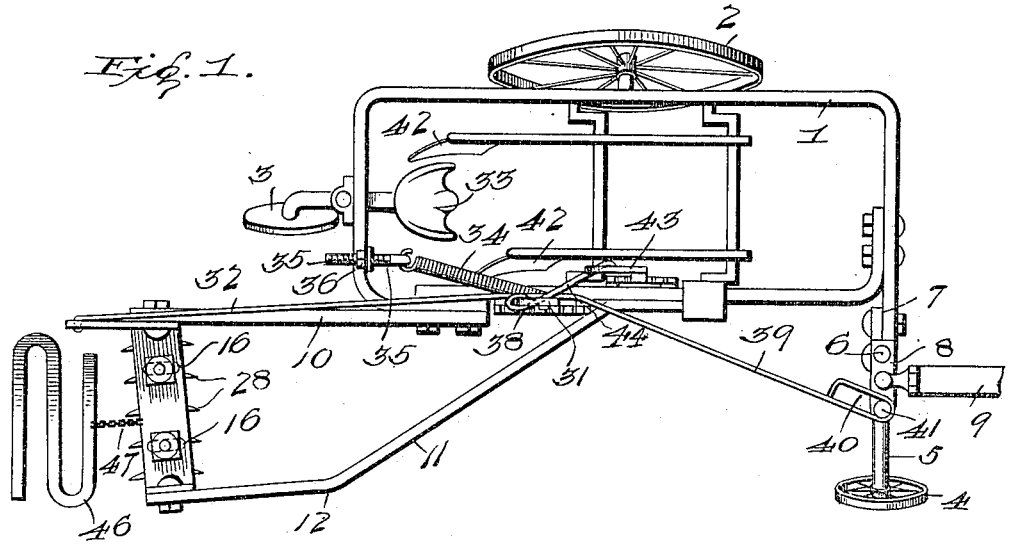
Figure 2:
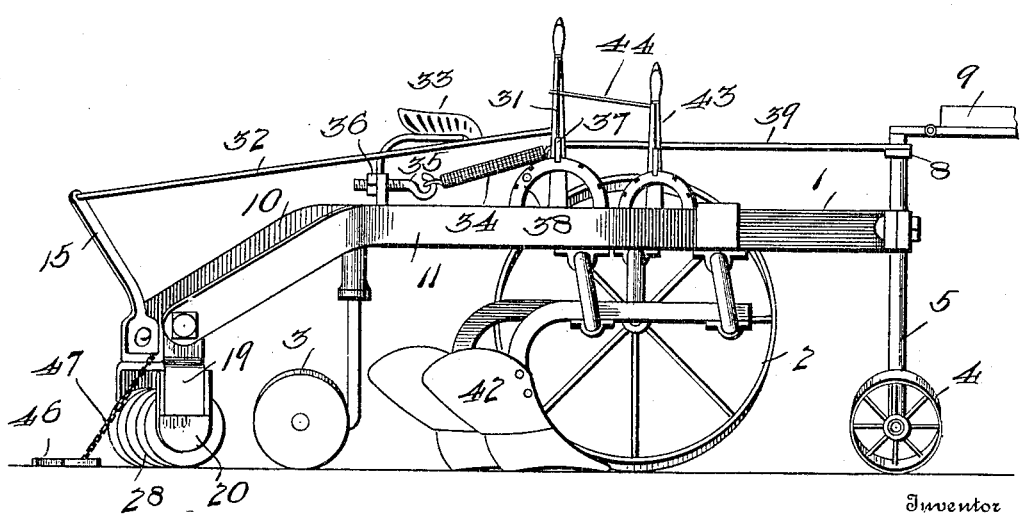

In the accompanying drawings, Figure 1 is a plan view of a wheeled plow, showing the harrow attachment applied thereto. Fig. 2 is a side elevation of the same. Fig. 3 is an enlarged rear elevation of the harrow attachment. Fig. 4 is a detailed section showing one of the bearings of the shaft of the harrow elements. Fig. 5 is a detailed view of the harrow-tilting lever and parts connected therewith. Fig. 6 is a perspective view showing the use of harrow-teeth in lieu of disks. Fig. 7 is a plan view of a portion of the machine, illustrating the use of rotary teeth as harrow elements and the driving mechanism therefor. Fig. 8 is a detailed cross-section, on an enlarged scale, through the shaft of the harrow elements shown in Fig. 7.

Like reference-numerals designate corresponding parts in all figures of the drawings.

Referring to the drawings, 1 designates the main frame or beam of a wheeled plow, the same being shown as substantially rectangular and supported at one side by a wheel 2 and at the rear by a centrally-located trailing caster-wheel 3 and at one of the forward corners by another caster-wheel 4, journaled on the lower outturned end of a standard 5, which is journaled at the point 6 in a lateral extension 7 of the plow-frame, as clearly shown in Figs. 1 and 2. The upper end of the standard 5 is provided with a crank 8, to which the draft-pole or tongue 9 is connected in such manner that when said tongue swings to one side the standard 5 turns, thus throwing the caster-wheel 4 forward or backward, as the case may be.

The harrow attachment comprises the rearwardly-diverging bars 10 and 11, secured rigidly to the plow frame or beam, the rear portion of the outer bar 11 being bent, as shown at 12, to extend substantially parallel to the bar 10. Between the rear ends of the bars 10 and 11 is mounted a pivotal hanger, which comprises a pivoted head 13, mounted between the bars 10 and 11 and connected thereto by means of pivots 14, said head being provided with a lever extension or arm 15, by means of which the head may be rocked on its pivotal connection. The cross-bar or horizontal portion of the pivoted head is provided with transverse slots 16 to adjustably receive bolts 17, which pass through the crown 18 of a fork and secure the fork to the pivoted head, at the same time providing for adjusting the angle of the fork with relation to the head, and thereby varying the obliquity of the harrow elements to suit the varying conditions of the soil. The arms 19 of the fork have secured thereto journalboxes 20, having shanks or extensions 21, which are fastened to the arms 19, as shown at 22.

23 represents the rotary shaft of the harrow elements, said shaft having its ends journaled in the boxes 20, as shown in Figs. 3 and 4. Each box 20 is preferably closed at the outer side, as shown in Fig. 4, and opened at the inner side, while the end of the shaft is encircled by antifriction-balls 24, which move in contact with steel washers 25 on opposite sides thereof. Beyond the inner washer 25 is a flexible washer 26, of felt, leather, or other material, which fits closely in the box and around the shaft and excludes dirt, the washer 26 being held in place by a metal washer or plate 27, fastened in the inner end of the box, all as shown in Fig. 4.

The harrow elements 28 may consist either of disks, as shown in Figs. 1, 2, 3, and 4, or they may consist of twisted teeth, as shown in Fig. 6, or rotary twisted teeth, as shown in Figs. 7 and 8. In the first four figures the disks are mounted on the shaft 23 and held at the proper distance apart by means of spacing and clamping sleeves 29 and a clamping-nut 30, threaded on the shaft.

In order to tilt or adjust the hanger, I provide a hand-lever 31, pivoted to the plow-frame and having attached thereto a connecting-rod 32, which connects with the arm 15 of the hanger, as shown in Fig. 2, the lever 31 being arranged near the driver's seat 33, so that he may vibrate the lever, and thereby tilt the hanger and raise and lower the harrow elements. A spring 34 is interposed between the lever 31 and a hook or eye 35, which passes through an opening in the plow-frame and is adjustable by means of a nut 36, whereby the tension of the spring may be regulated to hold the harrow elements yieldingly in operative position with any desired resistance. The lever 31 may be provided with a thumb-latch 37, engaging a rack 38 for maintaining any desired adjustment of the pivoted hanger.

A connecting-rod 39 extends from the lever 31 forward and has its forward end slotted, as shown in 40, to embrace a pin or stud 41 on the crank 8 of the standard 5, above described, the slot 40 permitting the rod 39 to slide forward when the lever 31 is moved forward for raising the harrow elements without affecting or turning the standard 5. At the same time when the tongue 9 is turned to the left the rod 39 draws the lever 31 forward, and the latter through the connections described raises the gang of disks 28 off the ground.

The plows 42 are made adjustable up and down, and the adjustment is effected by a plow-adjusting lever 43. In order to lift the harrow simultaneously with the plows, a rod 44 extends from the lever 43 to the lever 31 and is slotted or looped, as shown at 45, to embrace the lever 31, thus permitting the lever 31 to be vibrated without affecting the lever 43. When, however, the lever 43 is pushed forward to raise the plows, the lever 31 is also thrown forward, thereby raising the harrow elements.

46 designates an S-shaped drag, which is drawn along the surface of the ground in rear of the gang of disks, said drag being connected by a chain or its equivalent to the hanger.

The fork 18 may be detached from the pivoted head 13 and another interchangeable fork 48 substituted therefor, as shown in Fig. 6, said fork having a cross-bar 49 at the bottom, to which the harrow elements 28 are rigidly connected, the same being shown in the form of teeth having their rear portions deflected or twisted, so as to throw the pulverized soil to one side.

Under some conditions it may be desirable to impart positive driving motion to the shaft 23 and provide the latter with radially-projecting teeth, as shown in Figs. 7 and 8, said teeth or harrow elements being preferably twisted at their outer ends, as shown. In order to drive the shaft, the latter is extended at one end and connected by a universal joint 50 to a tumbling-shaft 51, having a universal joint 52, with a short shaft 53 extending transversely of the plow-frame 1 and driven by a sprocket wheel and chain connections 54 from the wheel 2 or its axle, as shown in Fig. 7. In this way the shaft 23 is positively driven, so as to cause the teeth 28 to break up and pulverize the soil.

55 designates a clutch for throwing the shaft 53 into and out of operation, and thereby correspondingly driving the shaft 23 or allowing the same to remain inactive.

It will be seen that the driver may, by means of the lever 31, quickly raise and lower the harrow, so as to avoid injury by the same coming in contact with a hard obstruction. Should the driver fail to notice the obstruction, the harrow will take care of itself, yielding and passing over the obstruction. In turning the machine the harrow is automatically raised by the connection described. When the operator elevates the plows, the harrow is raised at the same time by the connections set forth.

Having described the invention, I claim as new—

1. The combination with a plow-frame, of a rigidly-attached harrow-supporting frame laterally offset therefrom and comprising rearwardly-extending bars spaced apart, a hanger carried by the harrow-frame and comprising a head pivotally mounted between said bars and a fork detachably connected to the head and carrying harrow elements, and lever connections for tilting the hanger.

2. The combination with a plow-frame, of a rigidly-attached harrow-supporting frame laterally offset therefrom and comprising rearwardly-extending bars spaced apart, a head pivotally mounted between said bars, lever connections for tilting said head, and a fork carrying harrow elements and having a slotted and angularly-adjustable connection with said head.

3. The combination with a plow-frame, of a laterally-offset harrow-frame connected thereto, a hanger pivotally mounted in the harrow-frame, harrow elements carried by the hanger, manually-operated means for tilting the hanger, a pivoted draft-pole or tongue, and connections between the tongue and hanger whereby the movement of the tongue serves to rock or tilt the hanger.

4. The combination with a plow-frame, of a laterally-offset harrow-frame connected thereto, a pivoted hanger carried by the harrow-frame, harrow elements carried by the hanger, a lever for tilting the hanger, a caster-standard, a draft-pole or tongue connected to said standard, and a connection between said standard and lever whereby the turning of the standard tilts the hanger and the lever is adapted to tilt the hanger without affecting the standard.

5. The combination with a plow-frame, of a laterally-offset harrow-frame connected thereto, a pivoted hanger carried by the harrow-frame, harrow elements carried by the hanger, a lever for tilting the hanger, a plow adjustable up and down, a lever for adjusting the plow, and a connection between the plow-adjusting lever and the hanger-tilting lever whereby one operates the other.

6. The combination with a plow-frame, of a rigidly-attached harrow-supporting frame laterally offset therefrom, a hanger pivotally mounted in the harrow-supporting frame, means for tilting the hanger, a rotary shaft mounted in the hanger, rotary harrow elements actuated by said shaft, and means for driving said shaft.

In testimony whereof I affix my signature in presence of two witnesses.

JOSEPH L. CRISLER.

Witnesses:
HAZEL NORDEMAN,
REXFORD M. SMITH.